Figure 1:
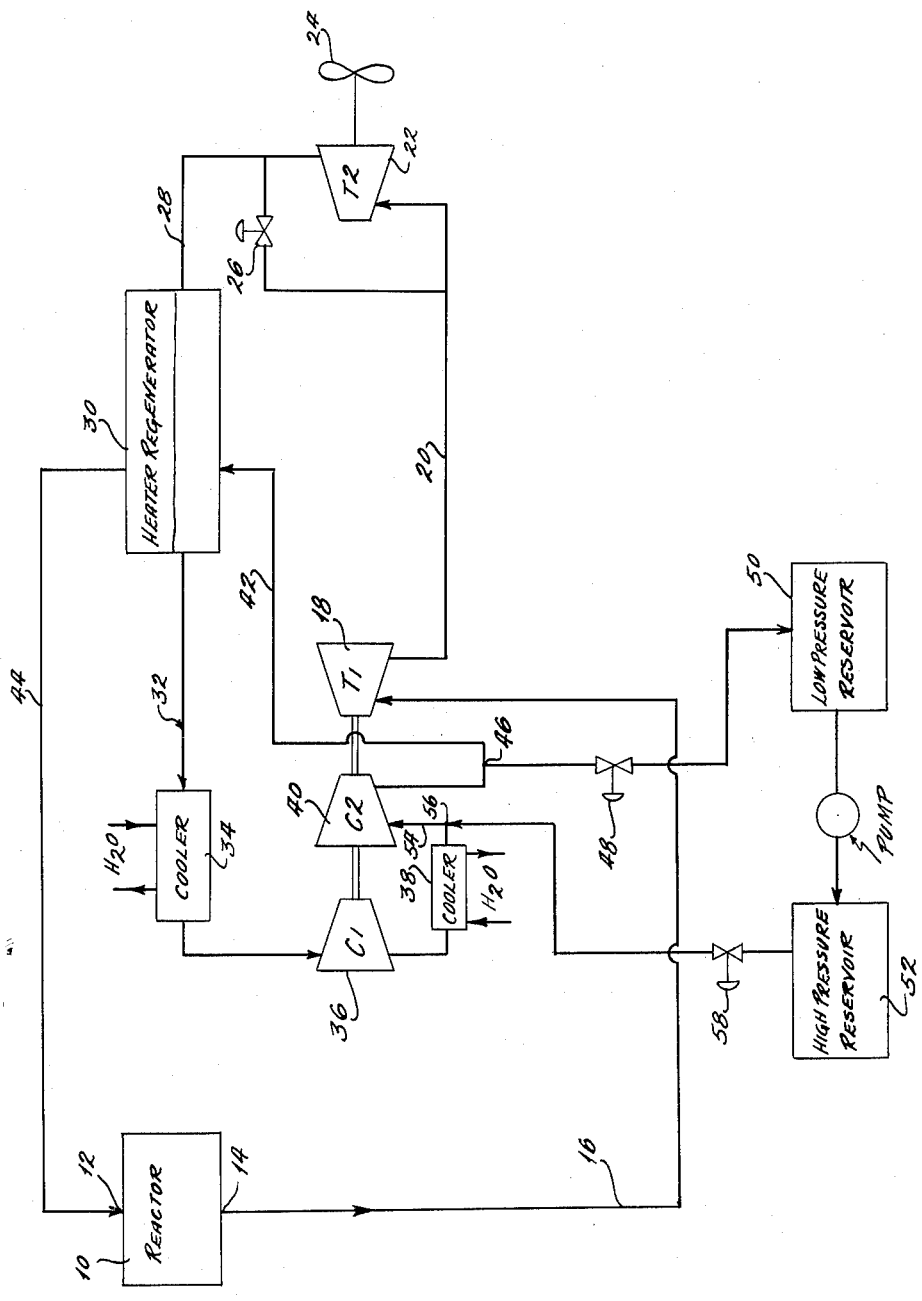

Nov. 20, 1962 K. A. HUB 3,065,162
NUCLEAR REACTOR CONTROL SYSTEM
Filed July 22, 1957 2 Sheets-Sheet 1

INVENTOR:
KENNETH A. HUB
By Bruninga & Sutherland
ATTORNEYS.

United States Patent Office 3,065,162
Patented Nov. 20, 1962

3,065,162
NUCLEAR REACTOR CONTROL SYSTEM
Kenneth A. Hub, University City, Mo., assignor to Internuclear Company, Clayton, Mo., a corporation of Missouri
Filed July 22, 1957, Ser. No. 673,244
1 Claim. (Cl. 204—193.2)

This invention relates to control systems for nuclear reactors and their associated power systems, and more particularly to reactors using a closed cycle gas turbine power system.

Generation of power in a nuclear reactor takes place in the form of neutron induced chain fission reactions in fissionable material. A sufficient quantity of fissionable material must be in a proper geometric arrangement, with or without neutron moderating material, to achieve a self-sustaining chain fission reaction. Basically, control of the power level of the chain fission reaction is achieved by varying the density of neutrons, in the fission inducing energy spectrum, appearing in the fissionable material. This can be accomplished in many ways, the most common method to date being the use of rods composed of materials having a great affinity for neutrons in the fission inducing energy spectrum. These rods occupy channels through the fissionable material and are withdrawn or inserted to vary the reactivity of the assembly as described below.

In order for a neutron induced chain fission reaction to be just self-sustaining, or critical, it is necessary that the same number of neutrons be produced in each succeeding neutron generation. If more neutrons are being produced in each successive generation, the assembly is said to be super-critical; that is, the power level is increasing in an exponential manner. If fewer neutrons are being produced in each successive generation, the assembly is said to be sub-critical and the power level is decreasing exponentially.

To maintain the power level of the neutron induced chain fission reactions occurring in the fissionable material constant, it is necessary that the assembly be just critical. For any given assembly at a particular point in its nuclear history, this critical point requires that the control rods be in some exact position with respect to the fissionable material, regardless of the power level at which the assembly may be operating at that instant. If it is desired to raise the power level of the assembly, the control rods have to be momentarily driven away from this just critical position with respect to the fissionable material of the assembly. This causes the assembly to become super-critical and the power level increases exponentially. However, the control rods must be returned, essentially, to the critical position at the time the desired power level is attained or it will continue to increase. A decrease in power level is accomplished in an inverse manner; the control rods are driven into the fissionable material from the critical position, the power level decreases exponentially, and the control rods are returned to the critical position near the instant the desired power level is attained. This describes, in a very basic manner, the way in which control rods are used to control the power level of a reactor and is necessary to a complete understanding of my invention.

The energy of the fissions occurring within the reactor is usually removed in the form of heat by fluids, usually liquids or gases. These fluids then pass through an external system where the heat energy picked up in the reactor is converted to mechanical energy and the cooled fluid is returned to the reactor for more heat energy. In such a system the reactor is the energy source and the external circuit is the energy sink (where the heat energy produced in the reactor is converted into useful work).

In most such systems it is desirable to vary the work output of the system either in response to load variations, as might be the case in a central station power plant, or to cause load variations, as might be the case in ship propulsion. To allow the system to follow or cause these external load variations, some control circuits maintain a near constant weight-rate of flow of heat transport fluid and allow the temperature of the fluid at the exit of the reactor to increase or decrease as the load increases or decreases. In other systems, however, temperature variations in the working fluid may be technically and/or economically undesirable. Systems employing gases as the heat transport fluid often fall into this category. My invention relates to systems of this latter category, and specifically to control of the work output capacity of reactor closed cycle gas turbine systems.

In its general application, this invention coordinates control of reactor power level with control of the heat transport capacity of the working fluid to accomplish a change in the work output capacity of the system with a minimum amount of change in the temperature of the working fluid throughout the system. As a result, the overall efficiency of the system will be nearly the same at fractional loads as it is at full load, and the fuel elements and other system components are protected from excessive temperatures and/or temperature variations.

It is therefore an object of my invention to provide a nuclear reactor system adapted to operate at substantially constant efficiency and temperature by changing the work output capacity of the reactor system by varying the weight-rate of flow of the working fluid, and then balancing the actual power level of the reactor as measured by neutron sensing devices against the allowable power level as determined by the heat transport capacity of the fluid entering the reactor.

It is a further object of my invention to provide an automatic control system adapted to maintain the above described balance so as to maintain constant operation of the reactor system regardless of changes in the power transfer capacity of the system introduced as a result of variations in the power output requirements.

Figure 2:
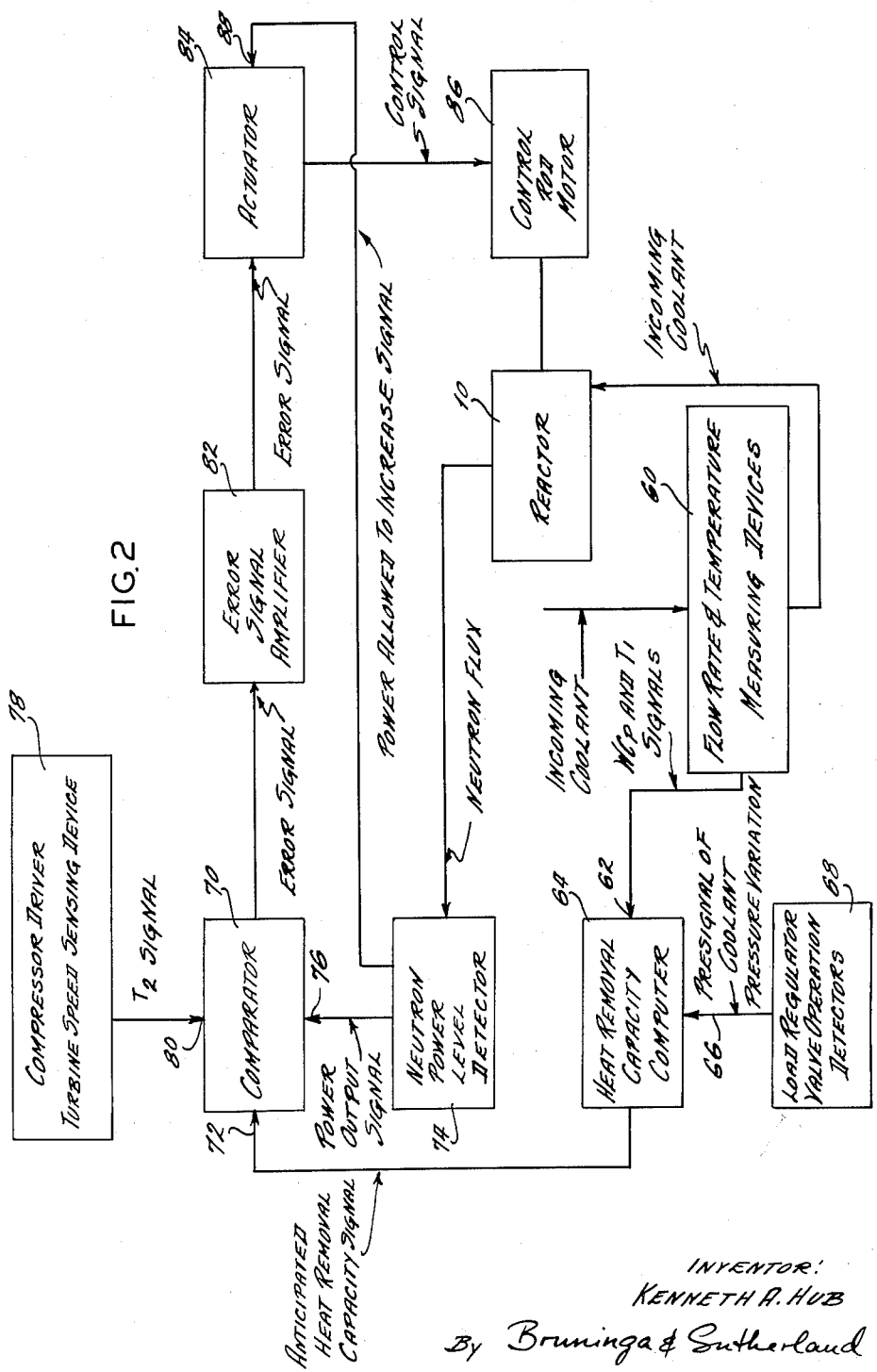

I shall now explain the system of my invention, reference being had to the drawings in which:

FIGURE 1 represents a flow diagram of the power system in connection with which may invention is used, and FIGURE 2 is a block diagram showing the electrical and mechanical interconnection of the various components of the apparatus of my invention.

By measuring the heat transport capacity of the working fluid before it enters the reactor and continuously comparing this with the power output of the reactor, my invention anticipates heat transport capacity changes approaching the reactor and adjusts the reactor to a compatible power level at the time this change appears in the reactor. In this manner, the temperatures of the working fluid, at the outlet of the reactor and elsewhere throughout the system, are maintained essentially constant regardless of variations in the work output capability of the system.

The work output capacity of closed cycle gas turbine systems is changed by varying the amount of gas in the system. This is accomplished by bleeding gas out of the system into a reservoir or feeding gas from the reservoir back into the system. These two functions will hereafter be referred to as "bleeding" or "boosting." Bleeding lowers the work output capacity of the system whereas boosting increases it.

According to this invention, continuous weight-rate of flow and temperature measurements are made on the heat transfer fluid sufficiently upstream of the reactor to compensate for time delays in the sensing circuits and control devices. This information is continuously combined with an allowable (or range of allowable) reactor outlet temperature signal in a heat removal capacity computer circuit, and a safe (or compatible) instantaneous reactor power level is determined therefrom according to the formula $$\text{Power} = KWC_p(T_2 - T_1)$$

where K is an arbitrary constant, W is the weight rate of flow, $C_p$ is the specific heat of the fluid, $T_2$ is the allowable outlet temperature, and $T_1$ is the measured inlet temperature of the working fluid.

Simultaneously, the actual instantaneous power level of the reactor is being continuously measured by neutron sensing devices. This actual instantaneous reactor power level signal and the allowable instantaneous reactor power level signal from the heat removal capacity computer are fed into a comparator. If the two signals show that the heat removal capacity of the working fluid is compatible with the present actual power level of the reactor, then no error signal is generated in the comparator and the system is in equilibrium. However, if the signal representing the heat removal capacity of the working fluid indicates that a higher or lower reactor power level (as represented by its signal) is required, the comparator generates an appropriate error signal.

This error signal can be applied at any number of different places within the major control circuitry to initiate the desired system response. The place of its application is not critical and will depend, to a large extent, on the desired characteristics of any particular system.

Referring now to the drawings, I have shown therein as a preferred embodiment a closed cycle gas turbine reactor ship propulsion system comprising several refinements on the basic system described above.

In FIG. 1, the numeral 10 designates a nuclear reactor of the gas-cooled type. Cooling gas introduced into the reactor at point 12 is heated by the nuclear reaction and exits from the reactor at point 14 at a slightly lower pressure but considerably higher temperature than at point 12. The gas then flows through pipe 16 to a compressor driver turbine 18 and from there through pipe 20 to the main power turbine 22 which may be adapted, for example, to drive the propeller 24 of a ship. A by-pass valve 26 is provided to bypass the turbine 22 for idling purposes. From turbine 22 the cooled gas flows through pipe 28 to the heater-regenerator 30. The gas then travels through a pipe 32 and heat exchanger 34 to a first compressor 36 which is followed by a second heat exchanger 38 and a second compressor 40. The gas then flows through pipe 42 back to the heater-regenerator 30 where it is heated, and then through pipe 44 back to the intake 12 of reactor 10. Control of the power output of the system is achieved by bleeding the system at point 46 by means of a bleeder valve 48 and storing the gas bled off in a low pressure reservoir 50. The stored gas is then pumped for reuse into a high pressure reservoir 52 from which it can be fed back to pipe 54 at point 56 by means of a booster valve 58.

If bleeder valve 48 is operated and gas is bled off at point 46, the pressure in the system will be reduced and turbine 22 will slow down, thus putting out less power. At the same time the reduction of pressure of the gas traveling through reactor 10 reduces the heat removal capacity of the gas, and consequently less nuclear power is required to keep the reactor at a fixed operating temperature.

Referring now to FIG. 2, the heat removal capacity of the working fluid is continuously determined from the instantaneous condition of the working fluid by a computer 64. Furthermore, in anticipation of the fact that the time delays of the sensing circuits and control devices might be too great to provide sufficiently fine control by placing the weight-rate of flow and temperature sensing devices upstream of the reactor, a signal 66 produced by booster and bleeder valve operation detectors 68 and which is a function of the rate of bleeding or boosting may be fed into the heat removal capacity computer 64 along with the weight-rate of flow and temperature signals 62. The actual weight-rate of flow $WC_p$ and input temperature $T_1$ to the reactor 10 are continuously measured by a set of measuring devices 60. The signals 62 from the measuring devices 60 may be combined in the heat removal capacity computer 64 with the signal 66 from the detectors 68, if any are being used in the particular system. The output of the computer 64 is an anticipated heat removal capacity signal 72 which is fed into a comparator 70. In the comparator 70 the signal 72 is combined with an actual instantaneous reactor power level signal 76. An error signal is generated by the comparator if the signals 72 and 76 are not in equilibrium. The magnitude of the error signal represents the degree of incompatibility existing between the heat removal capacity of the working fluid approaching the reactor and the actual power level of the reactor, while the sign of the error signal tells whether more or less power output is required from the reactor to make its power level compatible with the heat removal capacity of the working fluid approaching it. To protect the compressor driver turbine 18 from transient system fluctuations caused by operation of the bleeder or booster valves, a compressor driver turbine speed sensing device 78 provides a third input signal 80 to the comparator 70. An underspeed signal from the device 78 tends to cause the comparator 70 to put out an increased power output signal, while an overspeed signal from the device 78 will tend to cause the comparator 70 to produce a decreased power output signal. Thus the signal 80 will tend to either increase or decrease the error signal generated by the comparator 70 as a result of the comparison of the two basic signals 72 and 76.

The error signal produced by comparator 70 is amplified in a suitable amplifier 82, the output of which is used to actuate the control rod motor actuator 84. In the interest of increased safety, the neutron sensing device 74, which is normally used to measure the reactor power level, is also designed to put out a power allowed to increase signal 88 which is fed to the control rod motor actuator 84. The device 74 is so arranged that the signal 88 will be present only if the neutron count rate is below a certain predetermined safe level. The actuator 84 is so arranged that it cannot cause the control rod motor to drive the control rods in a power increasing direction unless the signal 88 is present.

The output of the actuator 84 is a control signal which can be either directly or indirectly used to drive the control rod motor 86 which operates the control rods of the reactor 10 in the manner first described herein.

The internal circuitry of the components of the system herein described is entirely conventional, and for this reason has not been shown in detail.

Although I have described a particular embodiment of my invention adapted for use in ship propulsion, it will be apparent that many different embodiments of my invention could be designed in accordance with the theory herein set forth. For example, in an appropriately designed system, it may not be necessary to furnish a signal 66 of anticipated working fluid pressure variation. Also, the basic system described herein can be used in connection with other control devices to suit the requirements of a particular installation. Accordingly, I do not desire to limit myself to the embodiment herein described, but rather to include all embodiments reasonably within the spirit of my invention as defined by the appended claim.

Having thus described the invention, what is claimed and desired to be secured by Letters Patent is:

A nuclear power plant comprising, in combination, a constant-temperature type gas-cooled nuclear reactor heat energy source, gas turbine means for utilizing the heat energy generated by said reactor heat energy source, closed cycle gas cooling system means for transferring said heat energy from said reactor source directly to said gas turbine means, said system means including compressor means for raising the pressure of the gas in said system means, thereby to create a flow of said gas through said reactor source to said turbine means, said compressor means being operatively positioned between and connected to said turbine means on its exhaust side and said reactor source at its gas inlet side, means for withdrawing gas from and adding gas to said gas cooling system means, as required, whereby the density of said gas can be decreased and increased, as required, said gas withdrawing and adding means including a gas storage reservoir system and means connected thereto for bleeding gas from and feeding gas to said closed cycle gas cooling system, as required, and control means for controlling said nuclear power plant, said control means including gas weight-rate of flow and gas temperature indicating means for measuring the actual weight-rate of flow and temperature of the gas in said closed cycle gas cooling system between exhaust side of said gas turbine means and said reactor source, and prior to entering the reactor source, signal generating means for producing a first output signal representative of said actual gas weight-rate of flow and temperature, means for measuring the actual weight-rate of flow of the gas passing between said closed cycle gas cooling system and said gas withdrawing and adding means simultaneously with the measuring of said gas actual weight-rate of flow and temperature by said indicating means, signal generating means for producing a second output signal representative of said actual gas weight-rate of flow of the gas passing between said cooling system and said gas withdrawing and adding means, computer means for receiving and combining said first and second output signals and for generating a third output signal representative of the anticipated heat removal capacity of the gas in said cooling system between said reactor source and said gas turbine means, neutron flux detector and measuring means for detecting and measuring actual instantaneous neutron power level of said reactor source simultaneously with the measuring of said gas actual weight-rate of flow and temperature by said indicating means, signal generating means for producing a fourth output signal representative of said neutron power level of said reactor source, means for measuring the power output of the gas in said cooling system at the gas turbine means, signal generating means for producing a fifth signal representative of said power output at said turbine means, comparator means for receiving and comparing said third and fourth output signals, on one hand, and said fifth output signal, on the other hand, and generating an error signal representative of a mathematical relation between said third and fourth output signals, on one hand, and said fifth output signal, on the other hand, reactor heat source control rod means for adjusting the neutron power level of said reactor heat source, control rod actuator means receiving said error signal and being operatively responsive thereto for actuating said control rod means in said reactor heat source, whereby the neutron power level of said reactor heat source is adjusted with respect to the anticipated heat removal capacity of said gas in said closed cycle gas cooling system, thereby keeping the temperature of the reactor heat source substantially constant by reason of the control action of said plant being determinable in accordance with the weight-rate of flow and temperature of the gas at the inlet of and prior to passing into said reactor heat source.

References Cited in the file of this patent

FOREIGN PATENTS

| 631,068 | Great Britain | Oct. 26, 1949 |
| 631,069 | Great Britain | Oct. 26, 1949 |

OTHER REFERENCES

Atomics, vol. 2 (October 1951), pages 282–283.

Schultz: Control of Nuclear Reactors and Power Plants, McGraw-Hill Book Co., New York (1955), pages 176–180.

Schultz: Control of Nuclear Reactors and Power Plants, McGraw-Hill Book Co., New York (1955), pages 126, 133, 170.

IRE Trans. on Nuclear Science, vol. NS–1 (September 1954), pages 8–11 (article by Stubbs).

NAA–SR–Memo–1639, USAEC document dated may 21, 1956, pages 19–29.